Nov. 5, 1935.  E. E. LONGFELLOW  2,020,262
SURGICAL SPLINT AND REDUCING FRAME
Filed March 28, 1935   2 Sheets—Sheet 1
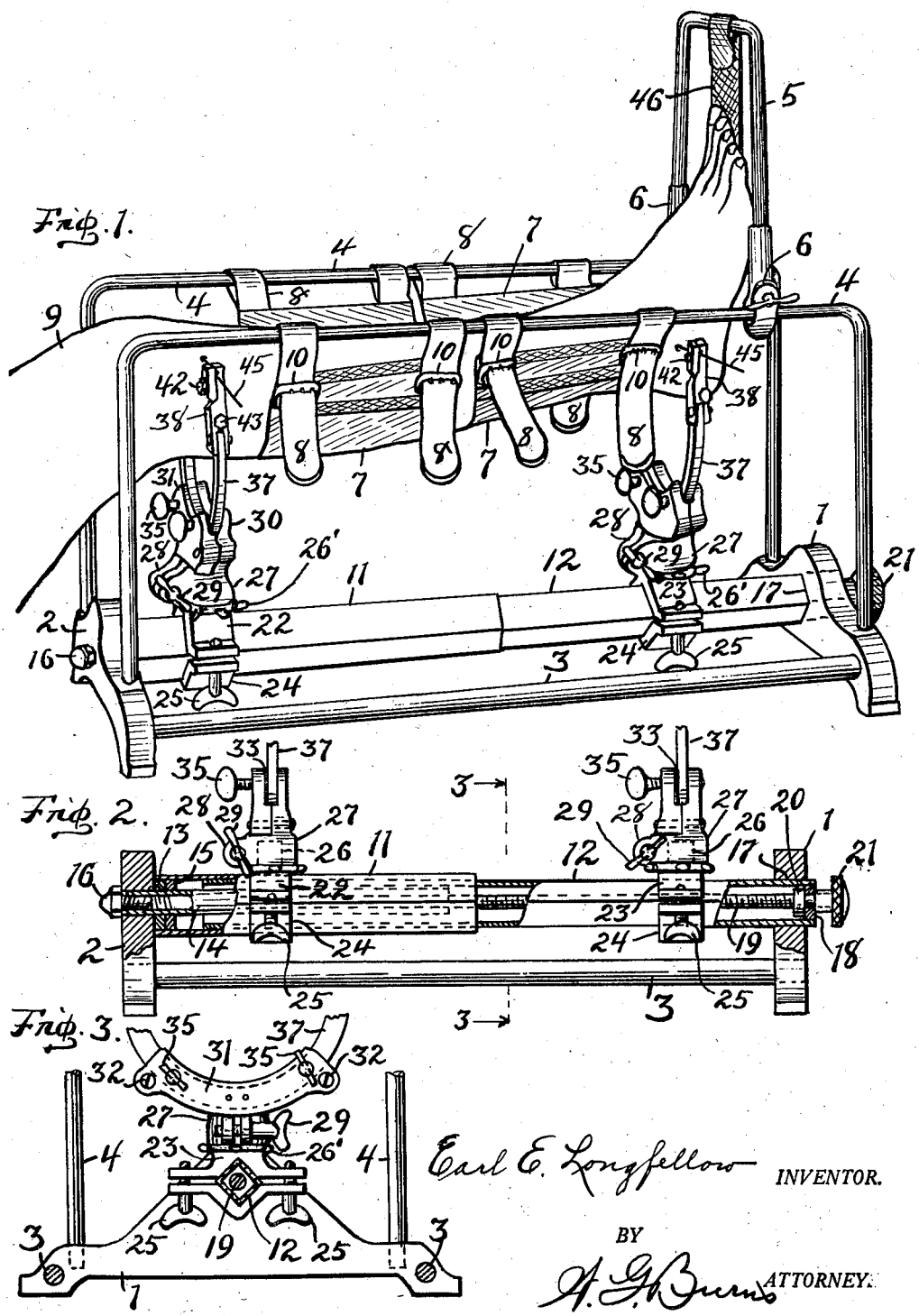

Nov. 5, 1935.                    E. E. LONGFELLOW                    2,020,262
                        SURGICAL SPLINT AND REDUCING FRAME
                        Filed March 28, 1935          2 Sheets-Sheet 2
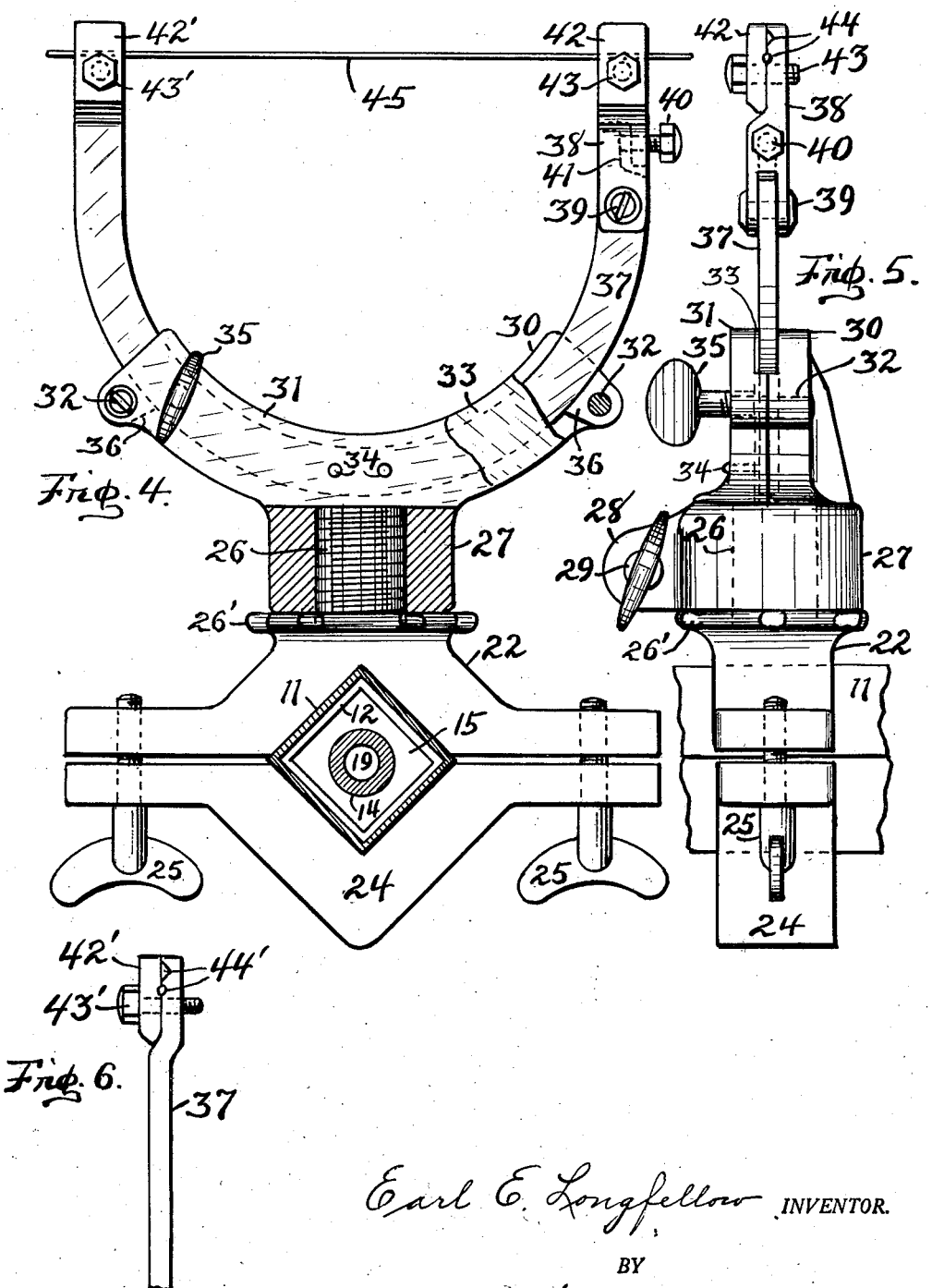

Patented Nov. 5, 1935

2,020,262

UNITED STATES PATENT OFFICE 2,020,262

SURGICAL SPLINT AND REDUCING FRAME

Earl E. Longfellow, Warsaw, Ind., assignor to Harry Herschel Leiter, Warsaw, Ind.

Application March 28, 1935, Serial No. 13,516

4 Claims. (Cl. 128—84)

This invention relates to improvements in surgical splints and reducing frames for skeletal treatment of fractured bones.

One of the objects of the invention is to provide a supporting mechanism for holding a pair of skeletal wire or pin-supporting bows in various adjusted positions as may be required for the proper alinement of the fragments of the fractured bones such as the tibia and fibula. Another object is to provide a simple expedient for conveniently and accurately establishing apposition of the fractured bone fragments and by which extension thereof is applied to a definite extent. Other objects and advantages of the invention will appear in the following description.

An illustrative embodiment of the invention is shown in the accompanying drawings, in which:—

Fig. 1 is a perspective view of a structure in which the invention is incorporated, as it appears when viewed from the side thereof;

Fig. 2 is a side elevation of the base-frame and bow-supporting members and adjusting means therefor, portions being cut away;

Fig. 3 is a cross-section of Fig. 2 on the line 3—3 thereof;

Fig. 4 is a detail view showing an elevation of one of the bows and its adjustable supporting means;

Fig. 5 is a side elevation projected from Fig. 4; and

Fig. 6 is a detail view of one end of the bow with its pin or wire clamp.

The illustrative embodiment of the invention includes a base-frame; a suspension appliance; pin or wire securing bows; and adjustable bow-supporting mechanism.

Base-frame and suspension appliance

The base-frame preferably is formed of end pieces 1 and 2 held definitely spaced apart by side rods 3, and upon said frame is removably superimposed a suspension appliance consisting of tubular U-shaped brackets 4, the ends of which extend removably in the end pieces 1 and 2 of the base-frame. The brackets 4 have mounted thereon a superframe 5 which projects upwardly and is provided at its lower ends with fasteners 6 that have clamping connection with said brackets 4 so as to have longitudinal adjustment on said brackets. Also, there are provided slings 7 which are suspended between the brackets 4 that are conveniently connected with said brackets by means of straps 8 for the support of an injured leg 9. The straps are provided with buckles 10 to permit adjustment of the positions of the slings 7 on the brackets as may be desired.

Adjustable bow-supporting mechanism

In the base-frame is disposed a beam consisting of two telescopic members 11 and 12, preferably rectangular in cross-section. The member 11 has secured in its outer end a perforated plug 13 through which extends a threaded tubular member 14 provided with an exterior rectangular collar 15 that fits within the telescopic member 11 so that axial turning movement of the tubular member 14 is circumvented. A cap screw 16 extends through the end piece 2 and is screwed into the tubular member 14 whereby the plug 13 is clamped between the collar 15 and the end piece 2 thereby securing the telescopic member 11 and the end piece 2 together. The telescopic member 12 projects into and fits snugly in the telescopic member 11, and its outer end projects loosely through the end piece 1 which has a rectangular opening 17 made therein that approximately fits the member 12. By this arrangement axial rotation of the beam is prevented while permitting longitudinal movement of the telescopic member 12 in the end piece 1. The outer end of the telescopic member 12 has secured therein a perforated plug 18 through which extends an adjusting rod 19 that has threaded relation with the tubular member 14, and has secured thereon a collar 20 and an operating knob 21 upon opposite sides of the plug 18 whereby relative longitudinal movement of the rod with respect to the telescopic member 12 is prevented.

Upon each of the telescopic members 11—12 is disposed a pedestal 22—23 provided with a corresponding clamp 24 having clamp-screws 25 whereby the pedestal is secured in place on the corresponding telescopic member after having been longitudinally adjusted to the desired position thereon. Each pedestal has an upwardly extending threaded stud 26 upon which is mounted an internally threaded hand-wheel 26' above which on said stud is mounted for free axial and angular movement thereon a slotted swivel-head 27 having perforated ears 28 through which extends a clamp-screw 29 whereby when the said clamp-screw is tightened the corresponding swivel-head is secured in adjusted position on its stud. It will be understood that the swivel-head is elevated adjustably on its stud 26 by turning the hand-wheel and is also capable of angular adjustment upon said stud and is held in such adjusted positions upon tightening of its clamp-screw 29. Each swivel-head 27 has opposed jaws 30—31 spaced apart that are secured together by bolts 32, and preferably there is provided a clamping spring plate 33 secured conveniently by rivets 34 to the inner face of the jaws 31, the outer portions of which plate are pressed inwardly by thumb-screws 35. Also, there is provided in connection with said jaws bearing lugs 36 located respectively between their lower outer ends.

Pin or wire securing bows

Between the jaws of each swivel-head is adjustably secured a pin or wire securing bow 37, preferably U-shaped, adapted to rest upon the lugs 36 and to be clamped in adjusted positions in the swivel-head between the jaws by tightening the thumb-screws 35 against the spring-plate 33. Each bow has on one of its ends an extension 38 that is movable laterally with respect thereto upon a pivot 39, and is provided with an adjusting screw 40 that bears against a lug 41 which projects from the corresponding end of the bow so as the screw is turned the extension is swung outwardly more or less accordingly. Upon said extension is provided a clamp-plate 42 secured by a clamp-screw 43, and indentations 44 are made in the inner face of the pivoted extension to form seats for a skeletal pin or wire 45. The other end of said bow 37 is provided with notches 44' and clamp-plate 42' secured by a clamp-screw 43' by which is secured the skeletal pin or wire 45.

Operation

In use, preferably, the injured leg is first cradled in the slings 7, after which the skeletal wires 45 are inserted through the proximal and distal bone fragments of the leg in the manner generally known in surgery. The extending ends of the wires 45 are secured by the clamps 42—42' to the bows 37 and the wires are drawn taut by turning the screws 40 which cause the corresponding extensions 38 to swing outwardly so that the wires are placed under tension to the desired extent. By adjustably moving the bows laterally between the corresponding jaws 30—31 relative rotation is applied to the bone fragments more or less according to adjustment of the bows. The bows are held in their lateral adjusted positions by tightening the screws 35 whereupon the bows are clamped firmly in place. By adjustably turning the swivel-heads 27 the bone fragments are angularly moved into alinement so that proper apposition is effected. By tightening the clamp-screws 29 the swivel heads are thereby held firmly on their pedestals in their adjusted positions. By manipulating the knob 21 the adjusting rod is turned whereupon the telescopic member 12 is adjustably moved longitudinally causing the space between the pedestals 22—23 to be increased more or less, and in this manner skeletal traction to a definite degree is applied to the injured member.

After the bone fragments of the injured leg have been adjusted and held locked in relative position by the skeletal wires, and while traction is maintained by the apparatus, a plaster cast is applied to the injured leg as in the ordinary practice, the extending ends of the wires being incorporated in the cast. In this manner is attained accurate mechanical control of both the proximal and the distal bone fragments. When permissible, by loosening the screws 35 the injured leg, while thus encased, together with the bows 37, are removed bodily from the appliance for subsequent treatment. When it is no longer necessary to maintain the wires 45 under tension, the bows 37 are removed by loosening the screws 42—42' thereby permitting disconnection of the bows from the wires. In this manner the patient is relieved of their encumbrance.

The superframe 5 affords an auxiliary support for the pedal extremity of the injured leg when connected by a tape 46 suspended from the top of the superframe and attached in any suitable manner to the foot of the injured leg.

I claim:—

1. In apparatus of the class described, a base-frame, a suspension appliance having brackets removably superimposed on said frame and provided with an adjustable superframe and slings that are suspended from said brackets, a non-rotatable beam disposed in said base-frame having two members one of which is adjustable and provided with means for axial movement thereof, a pedestal on each member of said beam independently adjustable thereon respecting each other, a swivel-head on each of said pedestals adjustably secured thereon, each swivel-head having jaws spaced apart, a skeletal wire-supporting bow disposed between the jaws of each swivel-head laterally movable therebetween and removable therefrom, means for securing said bows in adjusted positions, and means in connection with each bow for securing a skeletal wire and applying tension thereto.

2. In apparatus of the class described, a base-frame, a suspension appliance having brackets removably superimposed on said frame and provided with slings that are suspended from said brackets, a non-rotatable beam disposed in said base-frame having two members one of which is adjustable and provided with means for axial movement thereof, a pedestal on each member of said beam independently adjustable thereon respecting each other, a swivel-head on each of said pedestals adjustably secured thereon, each swivel-head having jaws spaced apart, a skeletal wire-supporting bow disposed between the jaws of each swivel-head laterally movable therebetween and removable therefrom, means for securing said bows in adjusted positions, and means in connection with each bow for securing a skeletal wire and applying tension thereto.

3. In apparatus of the class described, a base-frame, a non-rotatable beam disposed in said base-frame having two members one of which is adjustable and provided with means for axial movement thereof, a pedestal on each member of said beam independently adjustable thereon respecting each other, a swivel-head on each of said pedestals adjustably secured thereon, each swivel-head having jaws spaced apart, a skeletal wire-supporting bow disposed between the jaws of each swivel-head laterally movable therebetween and removable therefrom, means for securing said bows in adjusted positions, and means in connection with each bow for securing a skeletal wire and applying tension thereto.

4. In apparatus of the class described, a base-frame, two pedestals supported in the base-frame for independent longitudinal adjustment therein, means for adjustably moving longitudinally in said frame the support for one of said pedestals, a swivel-head on each of said pedestals adjustably secured thereon, each swivel-head having jaws spaced apart and bearing lugs between the ends of its jaws, a clamping-plate between the jaws of each swivel-head operatively associated with clamp-screws therefor, a skeletal wire-supporting bow disposed between the jaws of each swivel-head on the bearing lugs thereof and secured in lateral positions of adjustment by the corresponding plate when the screws therefor are tightened, and means in connection with each bow for securing a skeletal wire and applying tension thereto.

EARL E. LONGFELLOW.